March 25, 1924.  
C. A. STRAIN  
1,487,984

COLLAPSIBLE VEHICLE BED

Filed Aug. 7, 1922

Inventor;
Charles A. Strain,
per A. K. Martell
Attorney.

Patented Mar. 25, 1924.

1,487,984

UNITED STATES PATENT OFFICE.

CHARLES A. STRAIN, OF LOS ANGELES, CALIFORNIA.

COLLAPSIBLE VEHICLE BED.

Application filed August 7, 1922. Serial No. 580,054.

*To all whom it may concern:*

Be it known that I, CHARLES A. STRAIN, a citizen of the United States, residing at Los Angeles, in the county of Los Angeles and State of California, have invented new and useful Improvements in Collapsible Vehicle Beds, of which the following is a specification.

My invention relates to improvements in collapsible vehicle beds, and particularly to beds that are adapted for use within an enclosed vehicle. The objects of my improvement are, first, to provide a relatively inexpensive structure of this nature and, second, to afford facilities for readily installing such a device without making alterations in the vechicle.

Other objects and advantages will appear hereinafter and while I show herewith and will describe a preferred form of construction, I desire to be understood that I do not limit myself to such preferred form, but that various changes and adaptations may be made therein without departing from the spirit of my invention as hereinafter claimed.

I attain my objects by the device illustrated in the accompanying drawing, in which—

Similar numerals refer to similar parts throughout the several views.

Figures 3, 4, 5:
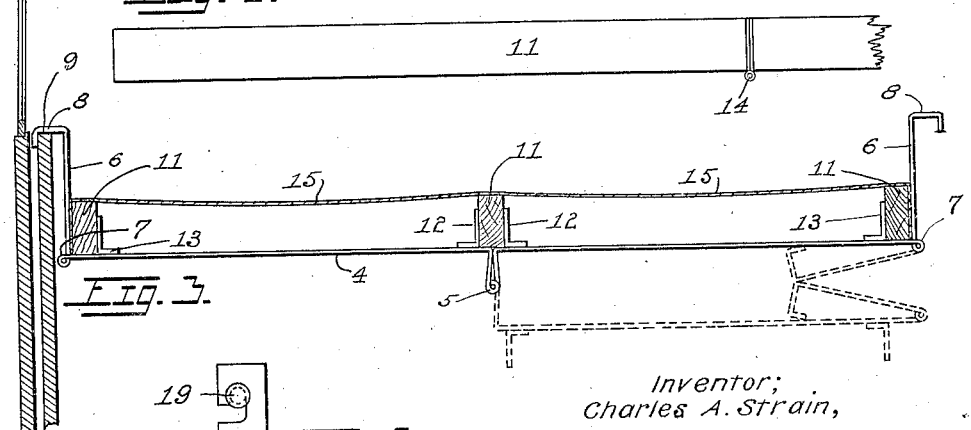
Figure 3 is a much enlarged cross sectional elevation taken on the line 3—3 of Fig. 2.
Figures 4 and 5 are fragmentary details in elevation and will be discussed later.

The transverse supporting bars 4, of which there is one at either end of the bed, are preferably hinge jointed in the middle in the manner shown to best advantage in Fig. 3 at 5. With the pivot of this form of hinge placed considerably below the bar, the latter will develop its full strength as a beam and at the same time retain the desirable feature of folding conveniently for stowing.

At each end of bars 4 are hanger arms 6 which are hinged to the bars as shown at 7. At their outer ends these arms are hooked, as at 8, in a manner adapted for engaging the side window ledges 9 of a vehicle after the window 10 has been raised out of its pocket, as shown in Fig. 3.

The longitudinal bed rails 11 are supported at their ends by bars 4. Ordinarily there are three of these rails and they are positioned on the bar by angle clips 12 in the center, and by angle clips 13 cooperating with arms 6 at the ends. These rails also are preferably hinge jointed at the center, as at 14, the hinge being closed transversely of the rail so as to afford abutting surfaces 14 to take the compressive stress on the joint when the rail is acting as a beam.

Figure 1:
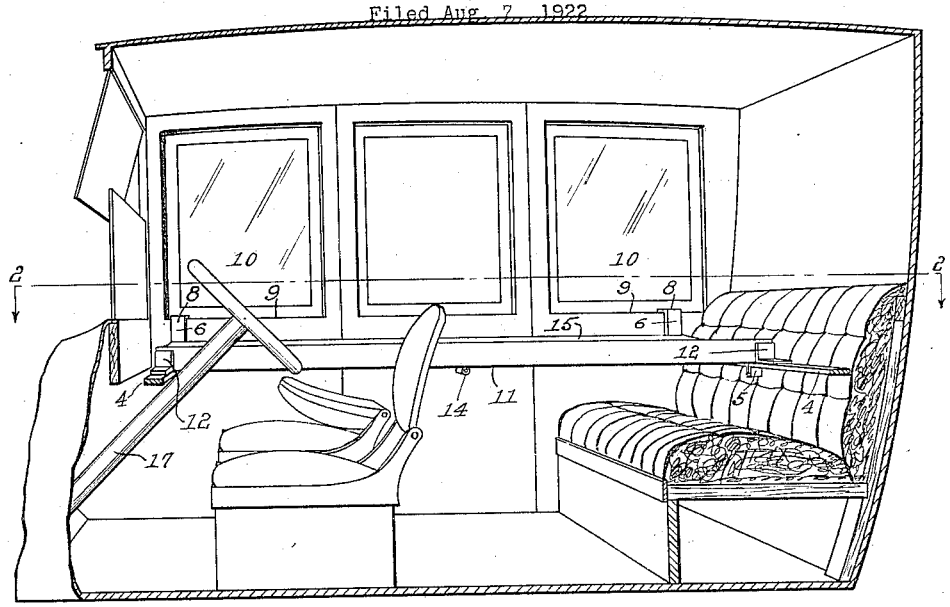
Figure 1 is a perspective view showing the interior of an automobile in which my invention has been installed.
Figure 2:
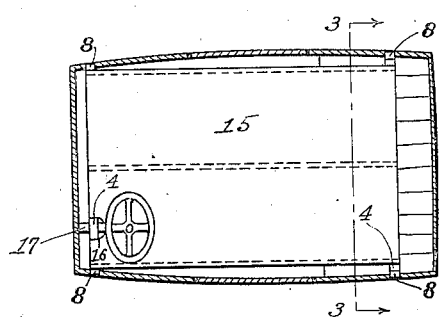
Figure 2 is a sectional plan view of such an automobile on a much reduced scale, and taken on the line 2—2 of Fig. 1.

The mattress portion 15 comprises a sheet of textile material, as heavy duck, attached to the side rails and stretched over the center rail. The angle clips and arms 6 effectively resist any rolling or overturning tendency of the rails. The mattress sheet must be slitted or notched where necessary to accommodate such obstructions as shown at 16 in Fig. 2, where the mattress is notched to provide for the steering column 17.

It will be obvious that in certain cases the use of this bed depends upon the possibility of removing or collapsing the forward seats of the vehicle. Where it is desired to use my bed full width in such cases, both of the forward seats will have to be collapsed. For a half width bed, however, only one of the seats need be collapsed and this feature of my invention makes it adaptable and valuable for emergency ambulance purposes.

When it is desired to employ the device in this manner, half of the mattress sheet 15 is rolled around one of the side rails, and the center rail, being needless, is dispensed with. The driver of the vehicle then has a half width bed along side of him, but is free to operate the steering wheel and operating levers of the car.

When it is desired to stow this equipment, the end bars and rails are folded and rolled in the material of the mattress to form a compact bundle.

Figure 5 illustrates an alternate form of hanger arm 18 employed in place of the hooked arms 6 when window ledges are not available for supporting the bed. In this case a headed stud 19 is fastened at the proper location on the interior walls at each corner of the car and the arms 18 engage these in the manner indicated in Fig. 5.

I desire to call especial attention to the relatively small space required for stowing the two supporting bars 4 when folded. This is indicated by dotted lines in Fig. 3, but it should be remembered that the drawing is necessarily out of scale and does not show these parts in their true proportion. As actually constructed the device is much lighter and less clumsy in appearance than the drawing is required for illustrative purposes to make it appear.

Having thus fully described my invention, I claim:

1. A bed comprising transverse bars hinged between their ends adapted when unfolded to span the interior space of a vehicle body, a pair of clips secured to said bars at the sides respectively of the hinges thereof, clips secured respectively near the ends of said bars, hooks on the ends of said bars for engaging the side edges of the vehicle body to support said bars unfolded, a longitudinal rail adapted to rest upon said unfolded bars between the clips secured at opposite sides of the hinges of said bars, longitudinal rails adapted respectively to rest upon said unfolded bars at their ends between said hooks and the adjoining clips, and a fabric adapted to be stretched over said rails.

2. A bed comprising transverse bars adapted to span the interior space of a vehicle, hooks pivoted to the ends of said bars for engaging the said edges of the vehicle body to support said bars, offset hinges for hinging said bars respectively between their ends so that they may be folded upon themselves at a distance apart to enable said hooks to be folded inwardly between the bar sections, clips secured to said bars at opposite sides of their hinges, a longitudinal rail adapted to rest upon said bars between said clips when the bars are unfolded, clips secured to said bars near their ends, longitudinal rails adapted to rest upon the unfolded bars respectively near the ends thereof between said hooks and the adjoining clips, and a fabric stretched over said rails.

CHARLES A. STRAIN.